United States Patent
Harada et al.

(10) Patent No.: US 11,071,120 B2
(45) Date of Patent: Jul. 20, 2021

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/331,823

(22) PCT Filed: Sep. 7, 2017

(86) PCT No.: PCT/JP2017/032188
§ 371 (c)(1),
(2) Date: Mar. 8, 2019

(87) PCT Pub. No.: WO2018/047886
PCT Pub. Date: Mar. 15, 2018

(65) Prior Publication Data
US 2019/0373613 A1    Dec. 5, 2019

(30) Foreign Application Priority Data
Sep. 9, 2016 (JP) .............................. JP2016-176858

(51) Int. Cl.
*H04W 72/08* (2009.01)
*H04L 5/00* (2006.01)
*H04W 16/14* (2009.01)
*H04W 72/04* (2009.01)
*H04W 74/08* (2009.01)

(52) U.S. Cl.
CPC ........... *H04W 72/08* (2013.01); *H04L 5/0007* (2013.01); *H04W 16/14* (2013.01); *H04W 72/0413* (2013.01); *H04W 74/0816* (2013.01)

(58) Field of Classification Search
None
See application file for complete search history.

(56) References Cited

U.S. PATENT DOCUMENTS

2013/0107116 A1* 5/2013 Charbit ................... H04L 5/003
                                                                348/388.1
2015/0358826 A1  12/2015 Wei et al.
(Continued)

OTHER PUBLICATIONS

International Search Report issued for PCT/JP2017/032188, dated Nov. 28, 2017 (5 pages).
(Continued)

*Primary Examiner* — Diane L Lo
(74) *Attorney, Agent, or Firm* — Osha Bergman Watanabe & Burton LLP

(57) ABSTRACT

The present invention is designed so that uplink control channels can be transmitted adequately even in carriers in which listening is required prior to transmission. According to one aspect of the present invention, a user terminal has a transmission section that transmits an uplink control signal in an uplink control channel in a given carrier, and a control section that exerts control to map the uplink control channel to a plurality of frequency resources which are discretely distributed in a frequency direction, at a same timing.

5 Claims, 17 Drawing Sheets

(56) References Cited

U.S. PATENT DOCUMENTS

| | | | |
|---|---|---|---|
| 2016/0036578 A1* | 2/2016 | Malladi | H04L 5/0057 370/329 |
| 2016/0037352 A1* | 2/2016 | Wei | H04W 72/0453 455/454 |
| 2016/0248553 A1* | 8/2016 | Shimezawa | H04L 1/1861 |
| 2017/0289993 A1* | 10/2017 | Yerramalli | H04W 72/0446 |

OTHER PUBLICATIONS

Written Opinion issued for PCT/JP2017/032188, dated Nov. 28, 2017 (4 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 Pages).

LG Electronics; "PUCCH transmission in LAA"; 3GPP TSG RAN WG1 Meeting #84 R1-160627; St Julian's, Malta, Feb. 15-19, 2016 (5 pages).

Lenovo; "UCI transmission on LAA SCell"; 3GPP TSG RAN WG1 Meeting #84 R1-162731; Busan, Korea, Apr. 11-15, 2016 (6 pages).

Ericsson; "Transmission of Uplink Control Information on an LAA SCell in UL Subframes"; 3GPP TSG RAN WG1 Meeting #84bis R1-163144; Busan, Korea, Apr. 11-15, 2016 (5 pages).

Extended European Search Report issued in European Application No. 17848824.3, dated Mar. 31, 2020 (7 pages).

ZTE; "Discussion on PUCCH for LAA UL"; 3GPP TSG RAN WG1 Meeting #84, R1-160334; St Julian's, Malta; Feb. 15-19, 2016 (3 pages).

LG Electronics; "HARQ-ACK PUCCH transmission fo Rel-13 CA"; 3GPP TSG RAN WG1 Meeting #80bis, R1-151502; Belgrade, Serbia; Apr. 20-24, 2015 (6 pages).

* cited by examiner

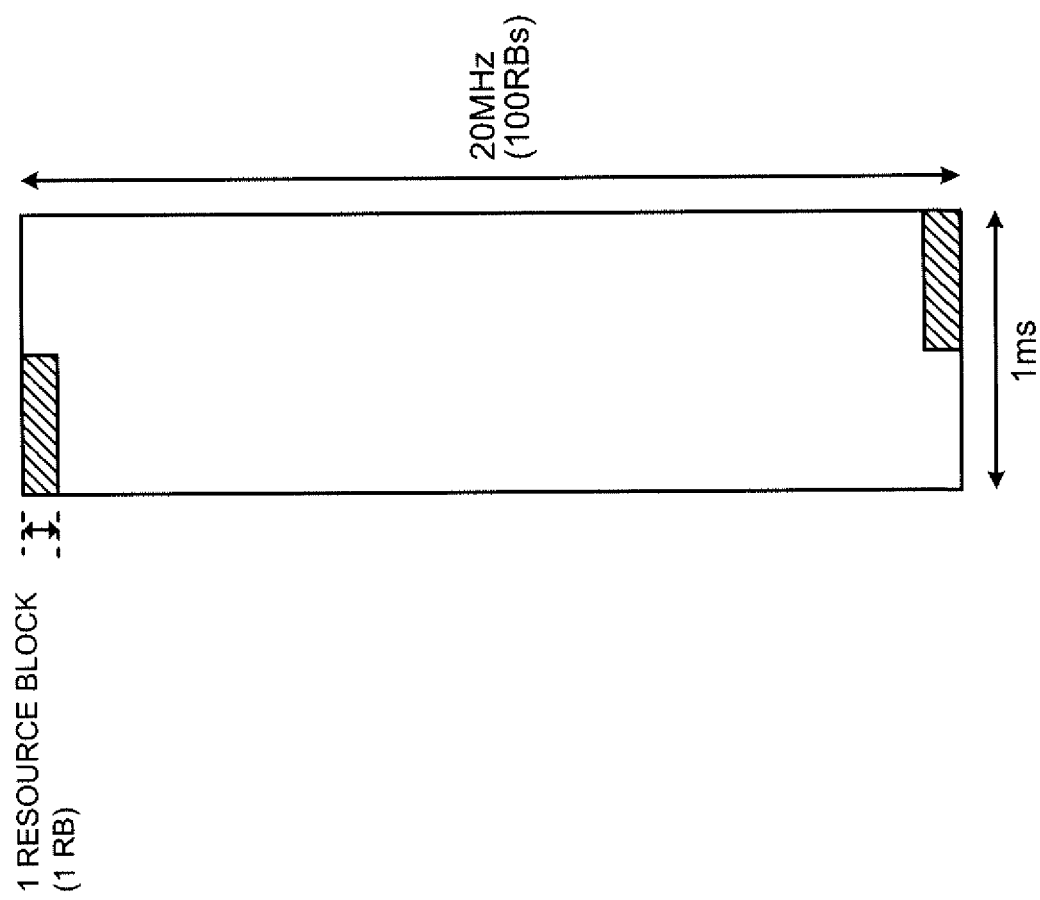

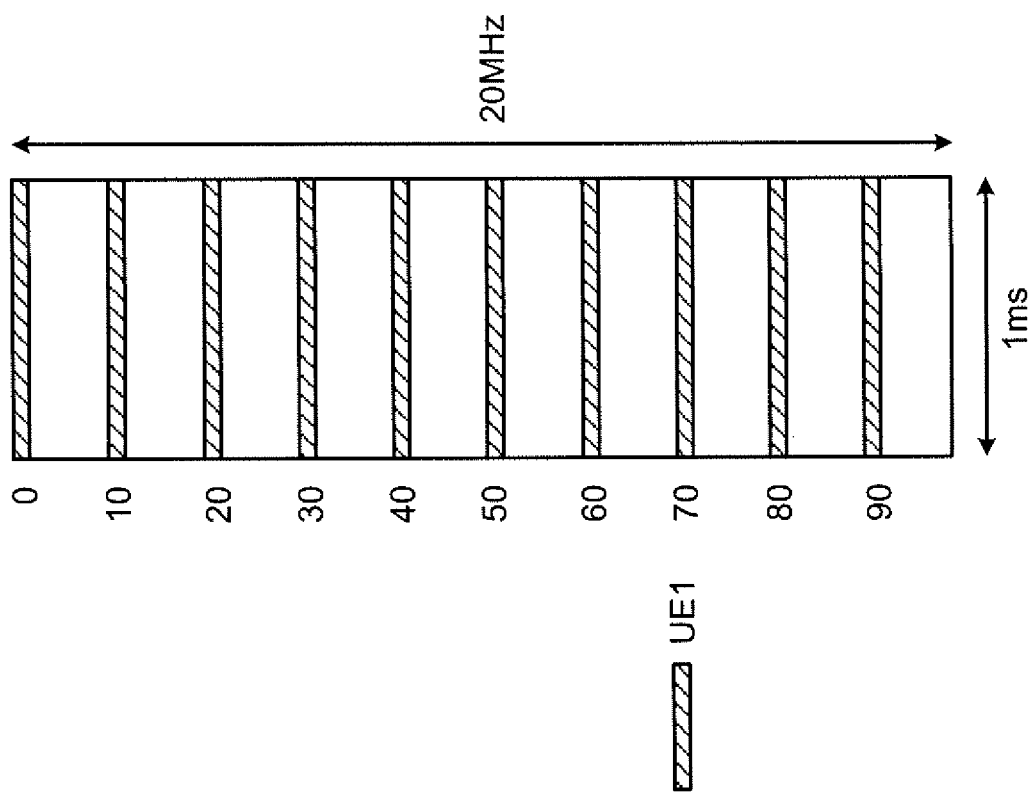

FIG. 7A

| CYCLIC SHIFT | MULTIPLEXING CAPACITY |
|---|---|
| 1 | 12 |
| 2 | 6 |
| 3 | 4 |
| 4 | 3 |
| 6 | 2 |
| - | 1 |

FIG. 7B

| CYCLIC SHIFT | MULTIPLEXING CAPACITY |
|---|---|
| 1 | 36 |
| 2 | 18 |
| 3 | 12 |
| 4 | 9 |
| ... | ... |

TYPE A-1
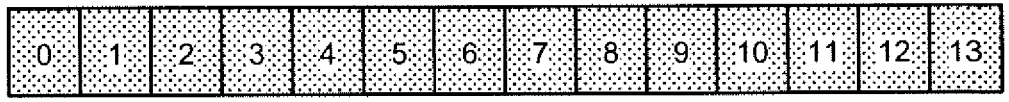
TYPE A-2
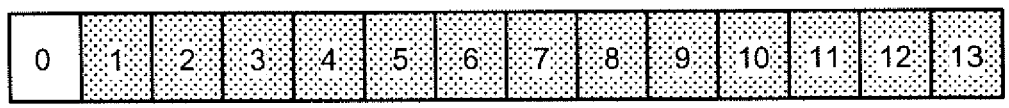
1 SYMBOL
TYPE A-3
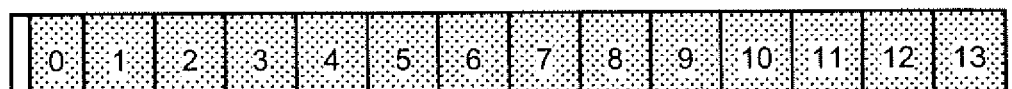
25us
TYPE A-4
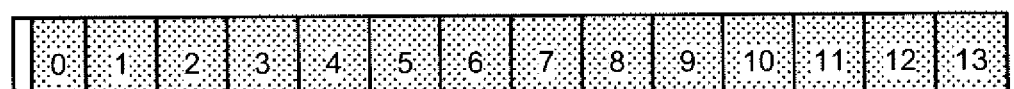
25us+TA
TYPE A-5
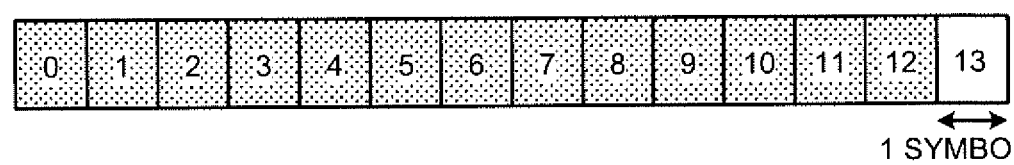
1 SYMBOL
TYPE A-6
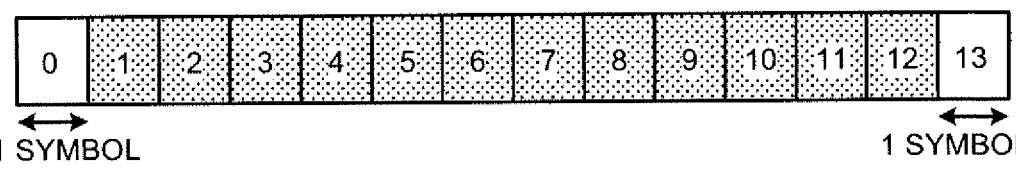
1 SYMBOL    1 SYMBOL
TYPE A-7
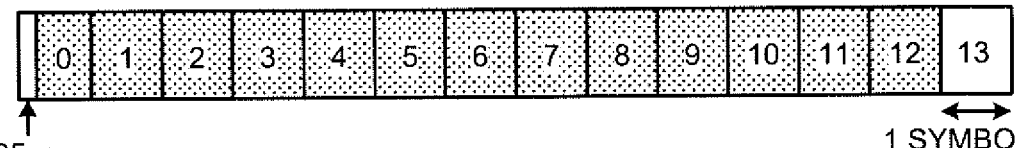
25us    1 SYMBOL
TYPE A-8
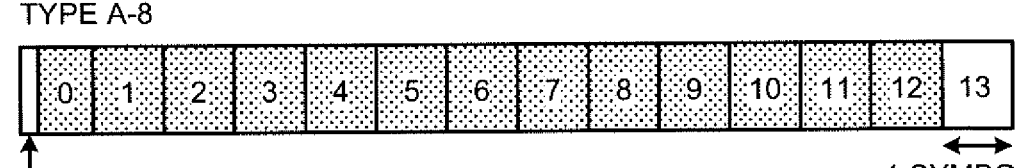
25us+TA    1 SYMBOL
FIG. 9

✓ 2 SYMBOLS LONG
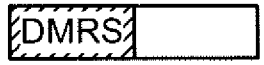
✓ 3 SYMBOLS LONG
MAXIMUM OCC LENGTH=2
✓ 4 SYMBOLS LONG
MAXIMUM OCC LENGTH=3
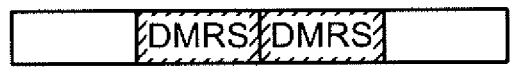
MAXIMUM OCC LENGTH=2
✓ 5 SYMBOLS LONG
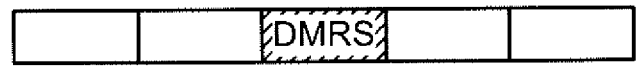
MAXIMUM OCC LENGTH=4
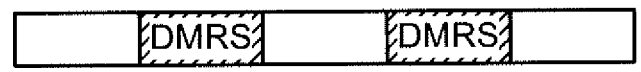
MAXIMUM OCC LENGTH=3
✓ 6 SYMBOLS LONG
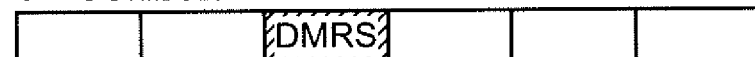
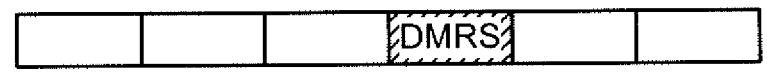
MAXIMUM OCC LENGTH=5
MAXIMUM OCC LENGTH=4
FIG. 11

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th Generation mobile communication system)," "5G+(plus)," "NR (New Radio)," "NX (New radio access)," "New RAT (Radio Access Technology)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CCs) is introduced in order to achieve broadbandization. Each CC is configured with the system band of LTE Rel. 8 as 1 unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed by different radio base stations are configured in UE, is also introduced. Each cell group is comprised of at least 1 cell (CC). Since multiple CCs under different radio base stations are integrated in DC, DC is also referred to as "inter-eNB CA."

Also, in LTE Rel. 8 to 12, frequency division duplex (FDD), in which downlink (DL) transmission and uplink (UL) transmission take place in different frequency bands, and time division duplex (TDD), in which downlink transmission and uplink transmission switch over time and take place in the same frequency band, are introduced.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are expected to realize various radio communication services by fulfilling varying requirements (for example, ultra-high speed, large capacity, ultra-low latency, etc.).

For example, in 5G, research is underway to provide radio communication services, referred to as "eMBB (enhanced Mobile Broad Band)," "IoT (Internet of Things)," "MTC (Machine Type Communication)," "M2M (Machine To Machine)," "URLLC (Ultra Reliable and Low Latency Communications)" and so on. Note that M2M may be referred to as "D2D (Device To Device)," "V2V (Vehicle To Vehicle)" and so on, depending on what communication device is used.

For LTE Rel. 14, eLAA (enhanced License-Assisted Access), which supports UL transmission in unlicensed carriers, is under study to fulfill the requirements for various types of communication, such as those described above. For example, uplink control information (UCI) may be transmitted in unlicensed carriers.

Since an unlicensed carrier is a band that is shared by a number of businesses and/or the like, in order to transmit signals in an unlicensed carrier, LBT (Listen Before Talk) must be performed successfully first. LBT refers to a technique of "listening (sensing)" before transmitting signals, and controlling transmission based on the result of listening.

In some countries, regions and so forth, regulations have been established regarding the use of carriers that require such pre-transmission listening, by taking into account LBT and so on. However, the method of transmitting an uplink control channel (PUCCH (Physical Uplink Control CHannel)) for transmitting UCI in existing LTE fails to comply with these regulations. Therefore, there is a need for a PUCCH transmission method that can be used in carriers where listening is required prior to transmission.

The present invention has been made in view of the above, and it is therefore an object of the present invention to provide a user terminal and a radio communication method, whereby an uplink control channel can be transmitted suitably even in carriers where listening is required prior to transmission.

Solution to Problem

According to one aspect of the present invention, a user terminal has a transmission section that transmits an uplink control signal in an uplink control channel in a given carrier, and a control section that exerts control to map the uplink control channel to a plurality of frequency resources which are discretely distributed in a frequency direction, at a same timing.

Advantageous Effects of Invention

According to the present invention, an uplink control channel can be transmitted suitably even in carriers where listening is required prior to transmission.

BRIEF DESCRIPTION OF DRAWINGS

FIGS. 1A and 1B are diagrams to show examples of PUCCH resources used in existing PUCCH formats;

FIG. 3 is a diagram to show examples of PUCCH resources according to a second embodiment of the present invention;

FIGS. 7A and 7B are diagrams to show examples of frequency-domain CSs to apply to DMRSs, according to the third embodiment;

FIG. 9 is a diagram to show examples of type-A PUCCH subframe structures;

FIG. 11 is a diagram to show examples of DMRS configurations that can be used for sPUCCH;

DESCRIPTION OF EMBODIMENTS

Figure 2B:
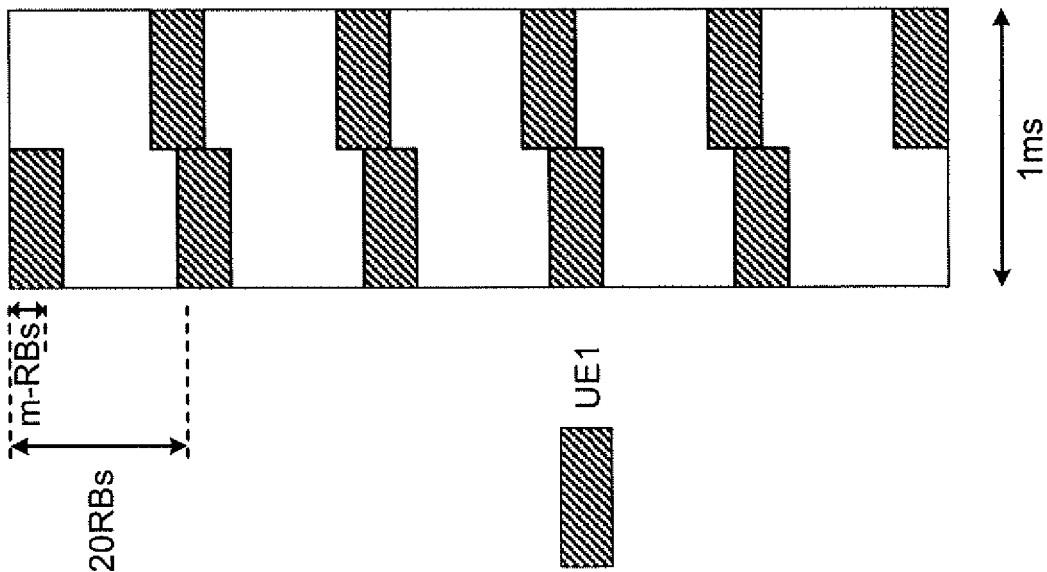
FIGS. 2A and 2B are diagrams to show examples of PUCCH resources according to a first embodiment of the present invention.

Envisaging 5G/NR, studies are in progress to use not only licensed carriers, but also unlicensed carriers for communication. A licensed carrier is a frequency carrier that is exclusively assigned to one business. An unlicensed carrier is a frequency carrier that is shared by multiple businesses, RATs and so forth.

In licensed carriers, there is no particular limitation on the timing for transmitting signals, whereas, in unlicensed carriers, LBT (Listen Before Talk) must be performed successfully first, in order to transmit signals. LBT refers to a technique of "listening (sensing)" before transmitting signals, and controlling transmission based on the result of listening.

For LTE Rel. 14, eLAA to support UL transmission in unlicensed carriers is under research, so that, for example, transmitting UCI in unlicensed carriers will be a possibility.

However, the uplink control channel (PUCCH (Physical Uplink Control CHannel)) for transmitting UCI in existing LTE fails to comply with the regulations regarding the use of unlicensed carriers.

For example, according to the rules of the European Telecommunications Standards Institute (ETSI), in order to use 5 GHz, which is one unlicensed carrier, the occupied channel bandwidth (OCB), which occupies 99% of signal power, must constitute 80% or more of the system band. In addition, limitations are placed on the maximum transmission power spectral density (PSD) per predetermined bandwidth (1 MHz).

Meanwhile, in existing PUCCH formats, frequency hopping is implemented on a per slot basis, using only one or a number of resource blocks (RBs) at both ends of a predetermined band (for example, system band). FIG. 1 provide diagrams to show examples of PUCCH resources used in existing PUCCH formats.

FIG. 1 provide diagrams to show examples of PUCCH resources according to the first embodiment. FIG. 1A shows an example of a PUCCH format occupying 1 resource block (RB), and FIG. 1B shows an example of a PUCCH format occupying multiple RBs (m-RBs). FIG. 1 each show PUCCH resource for a given UE, in a period of 1 existing subframe (=1 ms), where the system band is 20 MHz (=100 RBs). Note that the drawings hereinafter will also illustrate examples of PUCCH resources in the time domain and the frequency domain, such PUCCH resources are by no means limiting. For example, the system band needs not be 20 MHz.

PUCCH transmission such as shown in FIG. 1A is seen when using PUCCH format 1, 1a, 1b, 2, 2a, 2b, 3 and 5. PUCCH transmission such as shown in FIG. 1B is seen when using PUCCH format 4.

In both examples of FIG. 1, looking at 1 slot of time, signal is transmitted in a narrow band, which does not satisfy the above-mentioned requirement for OCB. Also, looking at 1 subframe, although the requirement of OCB may be fulfilled, power is concentrated in a narrow band, and therefore transmission power is limited due to the requirement for PSD.

As described above, given that existing PUCCH formats fail to comply with the above-mentioned regulations, a new design is needed. Also, given that a new design like that is likely to occupy many RBs, there is also a need for reducing the increase of UL overhead.

So, the present inventors have come up with a PUCCH design that fulfills the regulation regarding bandwidth. According to one aspect of the present invention, UE uses a plurality of frequency resources that are discretely distributed in the frequency direction, to transmit an uplink control channel (for example, PUCCH) at the same timing, in a given carrier. In this case, each frequency resource may be represented by at least one of one or more RBs, one or more subcarriers, one or more resource block groups, and so on.

Furthermore, the present inventors have come up with a PUCCH design that can improve multiplexing capacity and/or reduce overhead.

Now, embodiments of the present invention will be described in detail below with reference to the accompanying drawings. The radio communication methods according to the herein-contained embodiments may be applied individually or may be applied in various combinations. Note that, although unlicensed carriers will be described below as examples, the present invention may be applied to licensed carriers as well. Also, more generally, the present invention may be applied to carriers that require listening before transmission (carriers in which listening is configured), or may be applied to carriers that do not require listening before transmission (carriers in which listening is not configured).

(Radio Communication Method)

With first and second embodiments of the present invention, PUCCH formats to fulfill the regulation for bandwidth will be described. Furthermore, with a third embodiment, a method for allowing a plurality of UEs to multiplex and use signals on predetermined PUCCH resources will be described. With a fourth embodiment, a method of reducing PUCCH overhead will be described.

First Embodiment

According to the first embodiment, UE repeatedly transmits the PUCCH in the frequency domain. For the PUCCH to be transmitted repeatedly, existing PUCCH formats, formats that enhance or modify existing PUCCH formats, or new PUCCH formats may be used. In addition, it is preferable that the PUCCH that is repeatedly transmitted carries the same contents, but different contents may be included depending on what frequency field is used (for example, what unit of repetition is used).

Figure 2A:
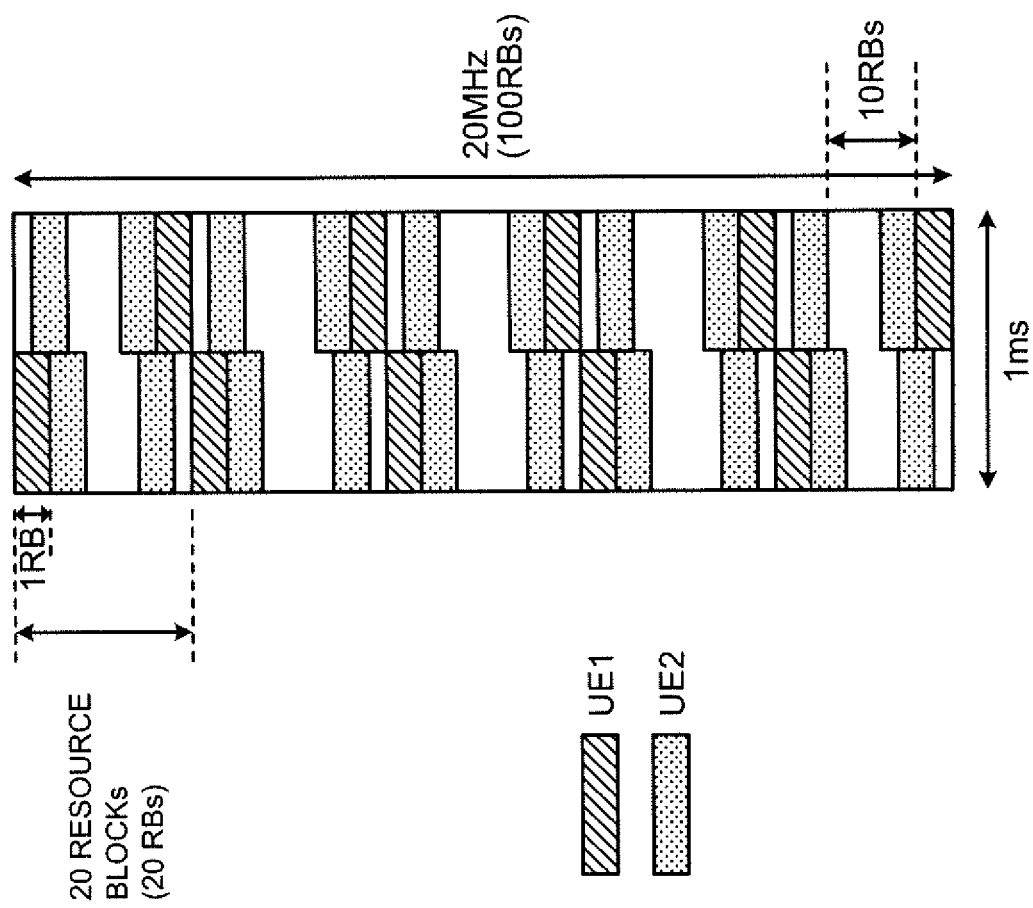

FIG. 2 are diagrams to show examples of PUCCH resources according to the first embodiment. FIG. 2A shows an example in which one PUCCH (unit of repetition) is 1 RB, and FIG. 2B shows an example in which one PUCCH (unit of repetition) is constituted by a plurality of RBs (m-RBs). FIG. 2 show PUCCH resources for 1 or 2 UEs, in a period of 1 existing subframe (=1 ms), where the system band is 20 MHz (=100 RBs).

Referring to FIG. 2A, the PUCCH for UE 1, which is 1 RB wide, is transmitted repeatedly at intervals of twenty RBs, and the PUCCH for UE 2, which is 1 RB wide, is transmitted repeatedly at intervals of 10 RBs. For the PUCCHs that are 1 RB wide, shown in FIG. 2, existing PUCCH formats 1, 1a, 1b, 2, 2a, 2b, 3 and 5 may be used.

Referring to FIG. 2B, the PUCCH for UE 1, which is a number of RBs wide, is transmitted repeatedly at intervals of twenty RBs. For the PUCCH that is a number of RBs wide, shown in FIG. 2B, conventional PUCCH format 4 may be used.

For example, by making the difference between the maximum frequency and the minimum frequency of the PUCCH which UE 1 repeatedly transmits equal to or more than 80% of the system band, UE 1 can execute PUCCH transmission in such a way to fulfill above-mentioned regulation regarding bandwidth.

Information about the PUCCH to be repeatedly transmitted in the frequency domain may be reported to (configured in) the UE. This information may include information that relates to at least one of, for example, the interval at which an existing PUCCH format is transmitted repeatedly (repetition interval), the location of the starting frequency (for example, the index of the RB where repetition is started), and the number of repetitions (for example, the number of PUCCHs in a system band).

Information about the PUCCH that is repeatedly transmitted in the frequency domain may be reported to (configured in) the UE by using higher layer signaling (for example, RRC (Radio Resource Control) signaling, broadcast information (MIB (Master Information Block), SIBs (System Information Blocks) and so on), MAC (Medium Access Control) signaling, and so on), physical layer signaling (for example, DCI (Downlink Control Information) and/or other signals, or by combining these.

According to the first aspect described above, the transmission of an uplink control channel can fulfill the above-mentioned regulations for bandwidth and PSD.

Second Embodiment

With the second embodiment of the present invention, the PUCCH is mapped to resources provided in an interlaced configuration. The interlaced configuration refers to a configuration to assume multi-cluster transmission on an RB level. 1 interlace may be defined as a set of a predetermined number of (for example, M) frequency resources that are one-RB wide and allocated at predetermined frequency intervals (for example, at intervals of 10 RBs) (this set may be also referred to as an "RB set"). Also, 1 interlace may be defined as a set of resources that are mapped in the same resource (RB or cluster) pattern every predetermined range (for example, 10 RBs) in the frequency direction.

Predetermined transmission units (frequency bands) that are discretely mapped in the frequency direction within 1 interlace may be referred to as "clusters." A cluster may be constituted by one or more consecutive frequency units (for example, RBs, subcarriers, resource block groups, and so forth). Note that, although frequency resources that correspond to clusters are assumed not to hop within a predetermined period (for example, within 1 subframe), they may hop as well.

According to the second embodiment, UE may repeat transmitting a PUCCH that is 1 RB wide, in 1 interlace. The following description will assume that the system band is comprised of 100 RBs and an interlace is a set of 10 RBs, distributed within the system band at 10-RB intervals, but the system band and the configuration of interlaces are by no means limited to these.

FIG. 3 is a diagram to show examples of PUCCH resources according to the second embodiment. FIG. 3 shows examples of PUCCH resources transmitted in 1 interlace. FIG. 3 shows PUCCH resources for one UE, in a period of 1 existing subframe (=1 ms), where the system band is 20 MHz (=100 RBs).

Referring to FIG. 3, the PUCCH for UE 1, which is 1 RB wide, is transmitted repeatedly at intervals of 10 RBs, by using an interlace of M=10. For the PUCCH that is 1 RB wide, shown in FIG. 3, existing PUCCH formats 1, 1a, 1b, 2, 2a, 2b, 3 and 5, formats that enhance or modify existing PUCCH formats, or new PUCCH formats may be used.

Note that a PUCCH 1 RB wide may be mapped to every frequency resource that is 1 RB wide and included in an interlace (the same contents may be mapped), or may be re-mapped to all frequency resources included in an interlace (different contents may be mapped per frequency resource 1 RB wide).

Also, according to the second embodiment, UE may divide a PUCCH several RBs wide, over one or more interlaces, and repeat transmitting these. That is, the UE may map a PUCCH several RBs wide to multiple interlaces, or to a single interlace.

Figure 4A:
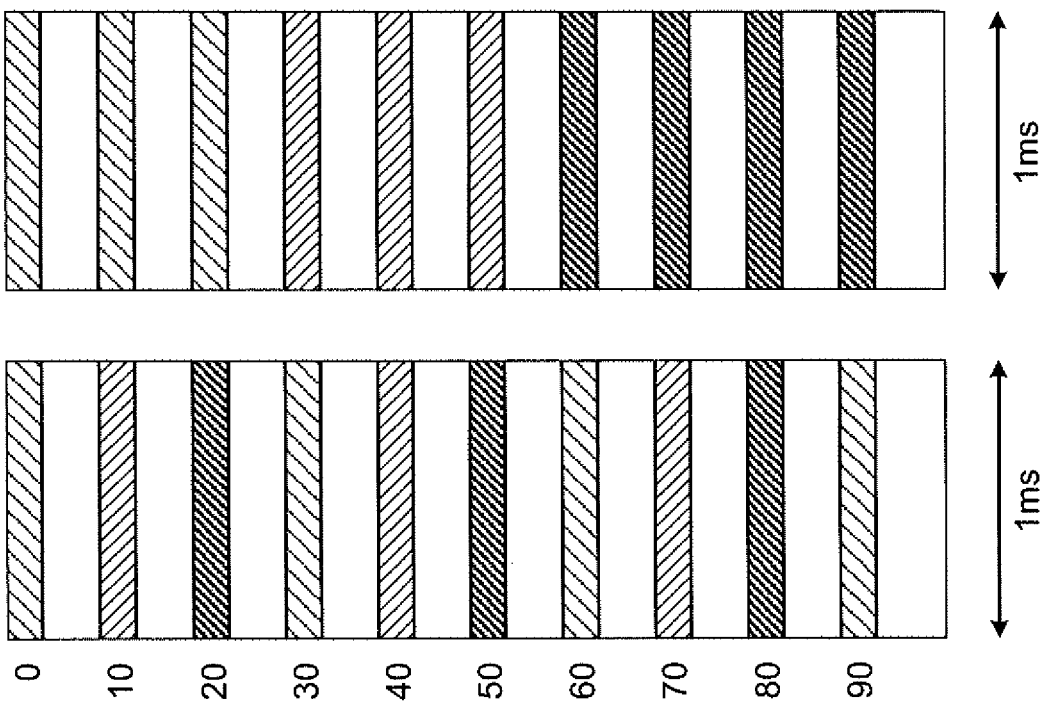
FIGS. 4A and 4B are diagrams to show other examples of PUCCH resources according to the second embodiment.

FIG. 4 are diagrams to show other examples of PUCCH resources according to the second embodiment. FIG. 4A shows examples of PUCCH resources transmitted in multiple interlaces (3 interlaces in the drawing). Referring to FIG. 4A, the PUCCH for UE 1, which is 3 RBs wide, is transmitted repeatedly at intervals of 10 RBs, by using 3 interlaces of M=10. In this case, the PUCCH 3 RBs wide is divided into parts each 1 RB wide, and these individual contents are transmitted using different interlaces.

Note that, in this example, RBs that are contained in multiple interlaces continue at intervals of 10 RBs, this is by no means limiting, and multiple interlaces including non-contiguous RBs may be used as well. Also, multiple consecutive interlaced resources may be referred to as "interlaced clusters" (or may be simply referred to as "clusters").

In the case of FIG. 4A, a predetermined interlace (for example, the interlace that is constituted by resources starting from the RB index 0 and provided at intervals of 10 RBs) has the same content in each RB.

Figure 4B:
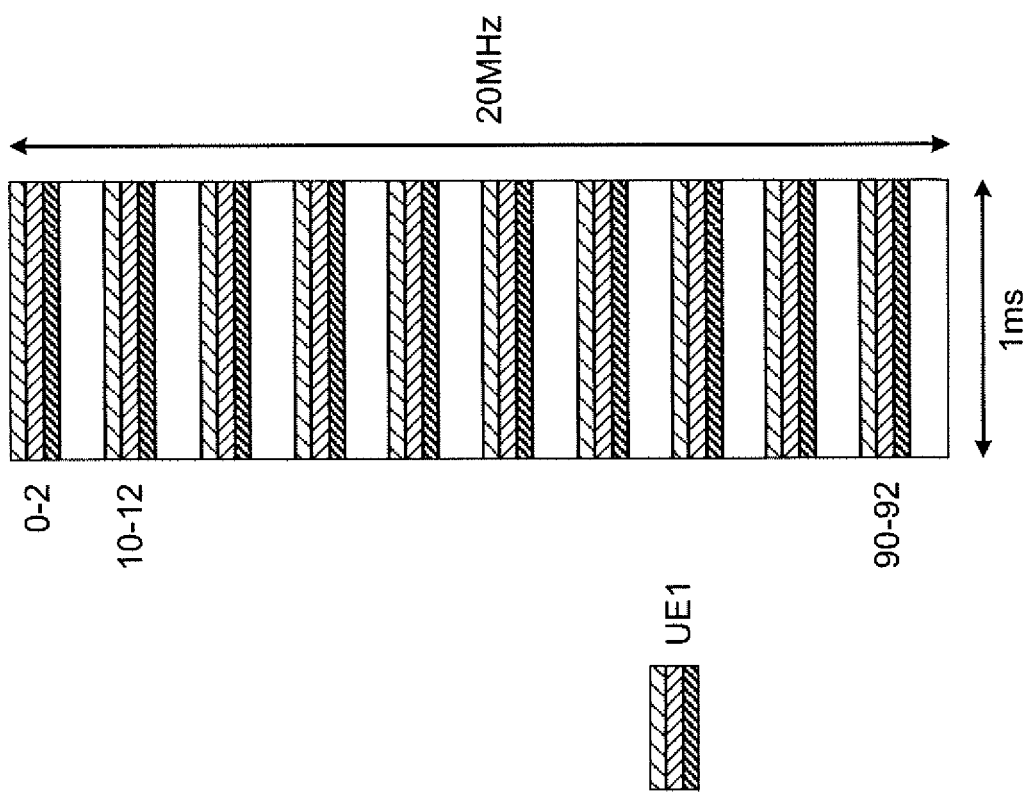

FIG. 4B shows examples of PUCCH resources each transmitted in 1 interlace. Referring to FIG. 4B, the PUCCH of UE 1, which is 3 RBs wide, is transmitted repeatedly, in divisions, at intervals of 10 RBs, by using 1 interlace of M=10.

In the case of FIG. 4B, a predetermined interlace (for example, the interlace that is constituted by resources starting from the RB index 0 and provided at intervals of 10 RBs) may be mapped so as to have different content in each RB.

For the PUCCHs that are several RBs wide, shown in FIG. 4, existing PUCCH format 4, formats that enhance or modify existing PUCCH formats, or new PUCCH formats may be used.

Information about the configuration of interlaces (interlace configuration information) may be configured in (reported to) UE by using higher layer signaling (for example, RRC signaling), physical layer signaling (for example, DCI) and/or other signals, or by combining these.

The information about the configuration of interlaces may be, for example, information about at least one of the frequency interval between RBs used, the number of RBs used, the bandwidth per cluster and so forth. Note that the configuration of interlaces may be changeable based on the system band, the transmission power of UEs, the maximum possible transmission power, the number of UEs that can communicate with a radio base station and so on. Also, interlaces may be configured the same as that used in other channels, such as PUSCH, or may be configured differently (independent configuration). In addition, an interlace does not necessarily have to be a set consisting only of discontinuous RBs, and may be a set to include consecutive RBs.

According to the second aspect described above, the transmission of an uplink control channel can fulfill the above-mentioned regulations for bandwidth and PSD.

Third Embodiment

Since the PUCCH transmission based on the first or second embodiment described above uses more frequency resources than PUCCH transmission to use existing PUCCH formats, significant overhead is incurred.

So, the present inventors have come up with an additional idea of improving the capacity of PUCCH resources by introducing user multiplexing, and arrived at the third embodiment.

According to the third embodiment, to multiplex PUCCHs, orthogonal codes (OCCs (Orthogonal Cover Codes)), cyclic shifts (CSs)) and/or the like may be used as methods of orthogonalization. For example, at least one of OCCs and CSs may be applied to PUCCHs, in the time domain and/or in the frequency domain. To be more specific, for PUCCHs, OCCs and CSs may be used in combinations such as time-domain OCCs+frequency-domain CSs, frequency-domain OCCs+frequency-domain CSs, and so on.

Also, different multiplexing schemes may be used depending on which PUCCH format is used. For example, different CSs and/or OCCs may be used per PUCCH format by taking into account the number of bits (codebook size) supported by the PUCCH format.

FIG. 5 provide diagrams to show examples of applying time-domain OCCs to PUCCHs according to the third embodiment. FIGS. 5A to 5D each show time resource corresponding to 1 slot of PUCCH format 5. Symbol #3 is a symbol of the demodulation reference signal (DMRS) for the PUCCH, and symbols #0 to #2 and #4 to #6 are data symbols (PUCCH symbols). OCCs are applied to data symbols.

Figure 5A:
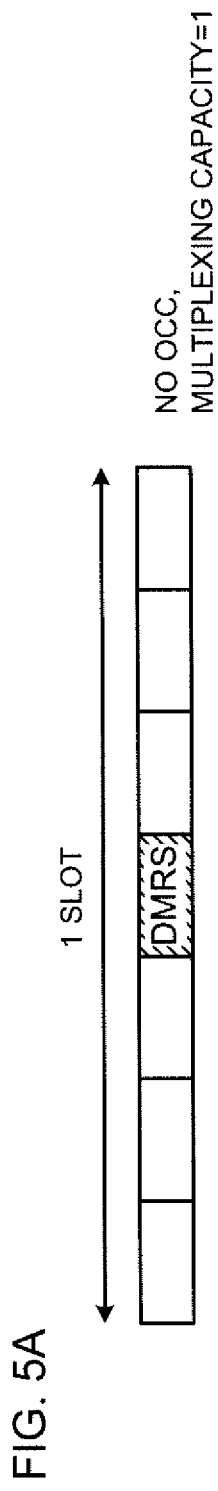
FIGS. 5A to 5D are diagrams, each showing an example of applying time-domain OCC to PUCCH, according to a third embodiment of the present invention.
Figure 5B:
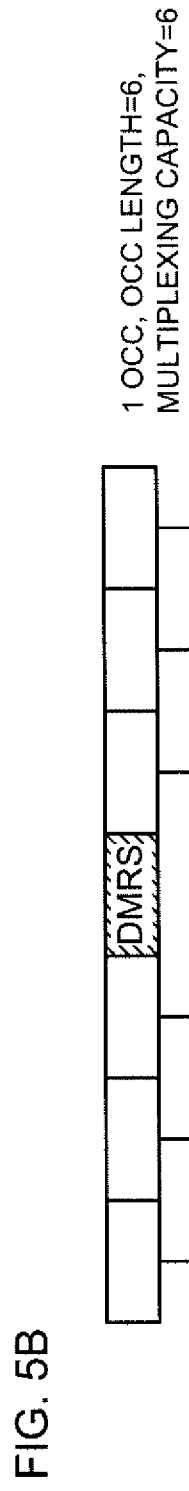

FIG. 5A shows an example in which no time-domain OCC is applied. In this case, the multiplexing capacity is 1. FIG. 5B shows an example in which an OCC of OCC length (code length)=6 is applied to all the data symbols in 1 slot (hence using a total of 1 OCC). In this case, the multiplexing capacity is 6. That is, PUCCHs for 6 UEs can be multiplexed so as to be distinguishable from each other.

Figure 5C:
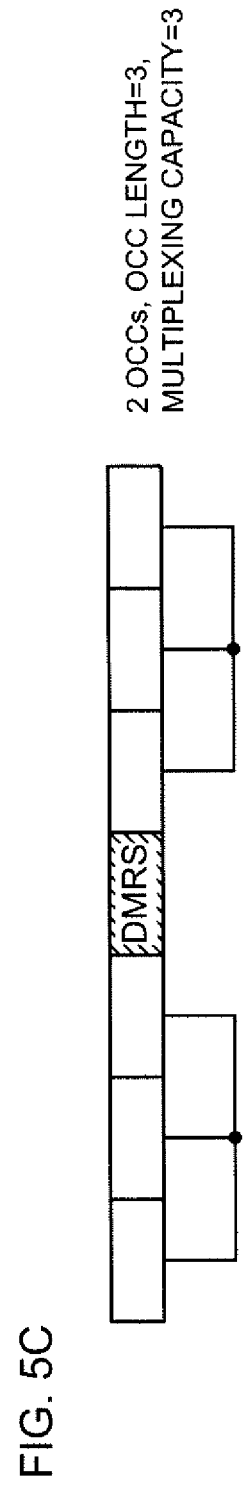
Figure 5D:
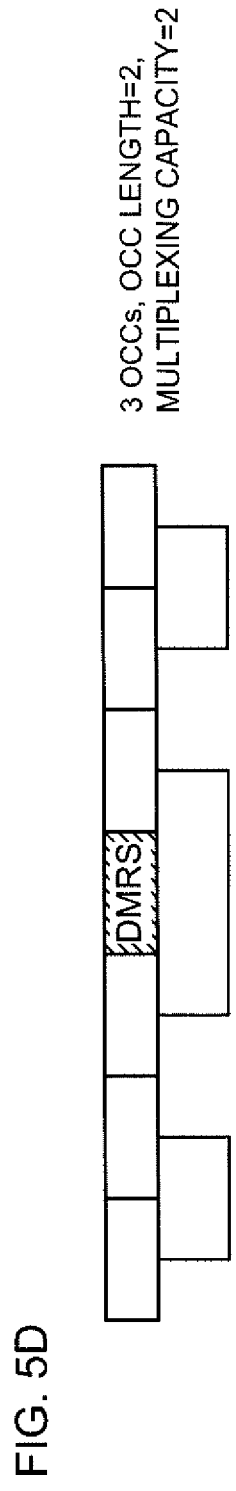

FIG. 5C shows an example in which OCCs of OCC length=3 are applied every 3 symbols in 1 slot (hence using a total of 2 OCCs). In this case, the multiplexing capacity is 3. FIG. 5D shows an example in which OCCs of OCC length=2 are applied every 2 symbols in 1 slot (hence using a total of 3 OCCs). In this case, the multiplexing capacity is 2.

Note that the symbols that are subject to time-domain orthogonalization (for example, OCCs) are not limited to the combinations shown in FIG. 5. For example, although, in FIG. 5, OCCs are applied to symbol sets comprised of neighboring symbols, OCCs may be applied to a symbol set comprised of symbols that are spaced apart from each other.

Figure 6A:
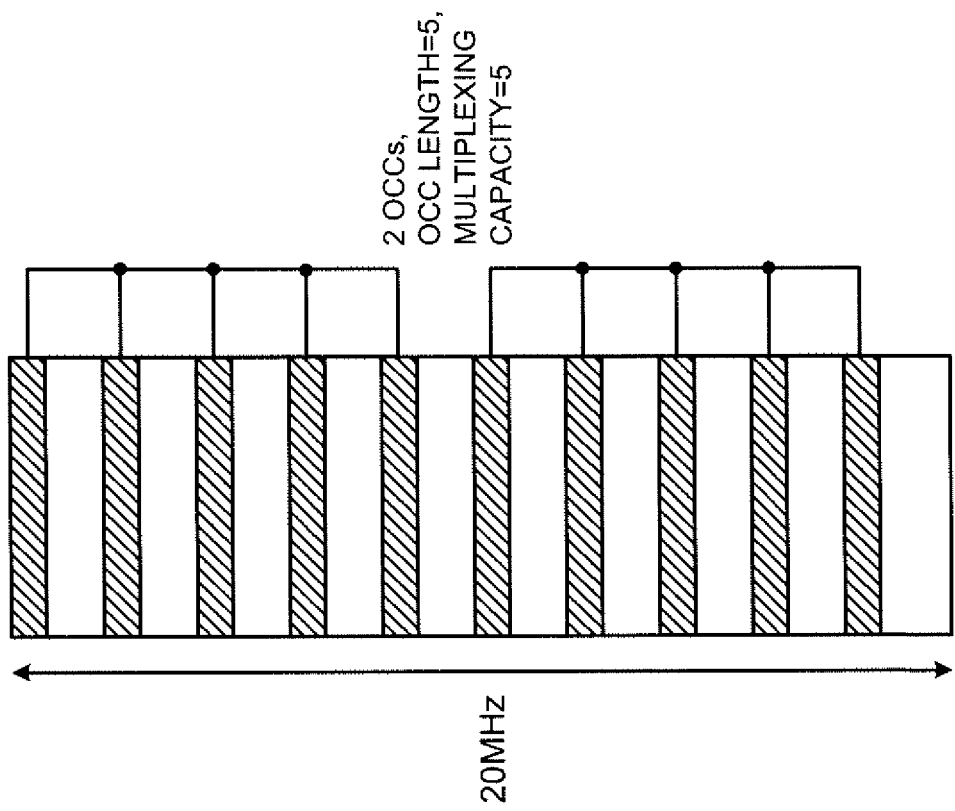
FIGS. 6A and 6B are diagrams, each showing an example of applying frequency-domain OCC to PUCCH, according to the third embodiment.
Figure 6B:
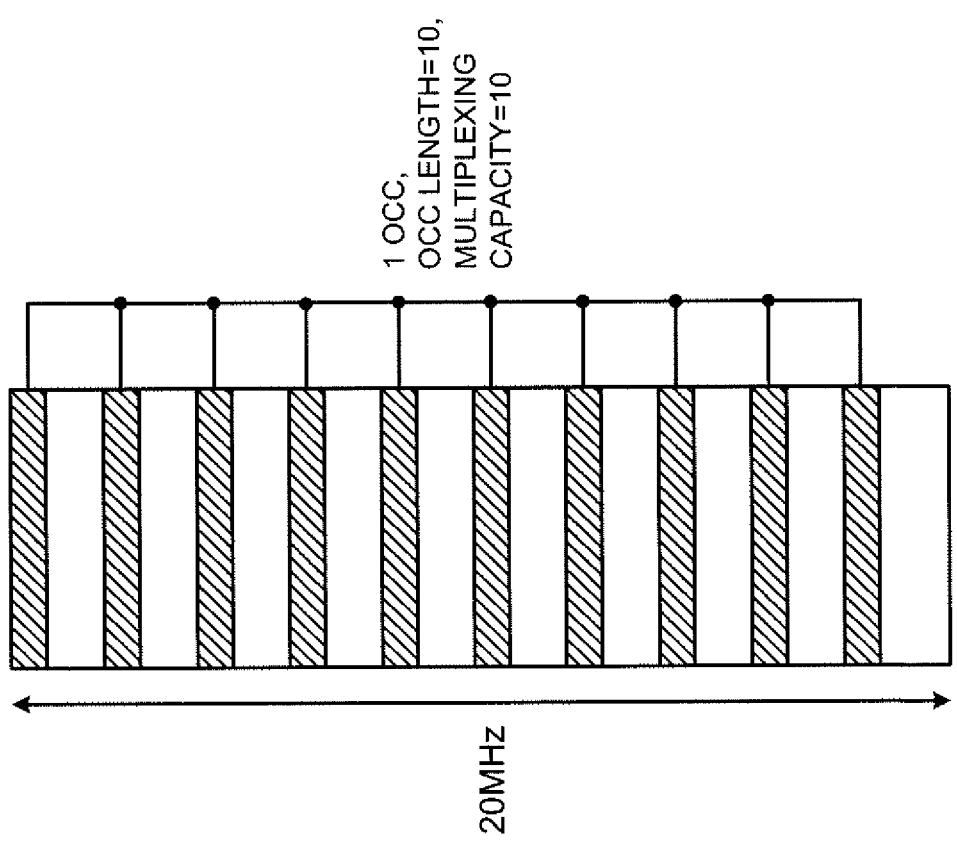

FIG. 6 are diagrams, each showing an example of applying frequency-domain OCC to PUCCH, according to the third embodiment. FIGS. 6A and 6B each show PUCCH resources that are distributed and transmitted at 10-RB intervals over 20 MHz.

FIG. 6A shows an example in which an OCC of OCC length=10 is applied to all the PUCCH frequency resources included in a system band (hence using a total of 1 OCC). In this case, the multiplexing capacity is 10. FIG. 6B shows an example in which all the PUCCH frequency resources included in a system band are divided into a plurality of sets, and an OCC of OCC length=5 is applied to each set (hence using a total of 2 OCCs). In this case, the multiplexing capacity is 5.

Note that the combinations of frequency resources that are subject to frequency-domain orthogonalization (for example, OCCs) are not limited to those shown in FIG. 6.

Also, for the DMRS used to decode the PUCCH, at least one of OCC and CS may be applied in the time domain and/or frequency domain. Here, the sequence length of this DMRS may be a length that is equivalent to 1 RB, or may be a length that is equivalent to a plurality of RBs.

A DMRS having a DMRS sequence length equivalent to 1 RB is suitable for use when repeating transmitting a PUCCH 1 RB wide. On the other hand, a DMRS having a DMRS sequence length equivalent to a plurality of RBs is suitable for use when repeating transmitting a PUCCH several RBs wide, when transmitting a PUCCH several RBs wide in one or more interlaces, and so on. Also, a DMRS having a DMRS sequence length equivalent to a plurality of RBs cannot be confined within a width of a PUCCH's RBs, and may be distributed and mapped to frequency resources for a plurality of PUCCHs.

FIG. 7 provide diagrams to show examples of frequency-domain CS applied to DMRS according to the third embodiment. FIG. 7 show the relationship between cyclic shifts to be applied to DMRS and multiplexing capacity, assuming that 1 RB is comprised of 12 subcarriers. FIG. 7A shows an example in which the length of the DMRS sequence corresponds to (is equivalent to) 1 RB, and FIG. 7B shows an example in which the length of the DMRS sequence corresponds to 3 RBs.

Referring to FIG. 7A, when cyclic shifts can be applied on a subcarrier-by-subcarrier basis, the same number of users as the total number of subcarriers included in 1 RB can be multiplexed, so that cyclic shift=1 is shown in association with multiplexing capacity=12. Cyclic shifts may be applied in units of 2, 3, 4 or 6 subcarriers, or cyclic shifts may not be applied (that is, multiplexing capacity=1).

Referring to FIG. 7B, when cyclic shifts can be applied on a subcarrier-by-subcarrier basis, the same number of users as the total number of subcarriers included in 3 RBs can be multiplexed, so that multiplexing capacity=36 is shown in association with cyclic shift=1. Cyclic shifts may be applied in units of 2, 3 or 4 subcarriers, or in units of more than 4 subcarriers, or cyclic shifts may not be applied.

In this way by using long sequences that are mapped over multiple RBs, it is possible to increase multiplexing capacity. Note that ZC (Zadoff-Chu) sequences may be used as DMRS sequences here, or other sequence may be used.

Also, the DMRS sequences shown above are simply examples, and UE does not have to be able to use all of the cyclic shift configurations shown in FIG. 7, and has only to support at least part of them. Also, even when the number of subcarriers included in 1 RB is less than 12 or more than 12, DMRS sequences may be generated and/or mapped based on the same concept.

According to the third aspect described above, the multiplexing capacity of PUCCH resources can be improved.

Note that, although OCCs and CSs have been described with the third embodiment as means of orthogonalization, other orthogonalization methods may be applied to PUCCHs as well.

Fourth Embodiment

Since existing PUCCH formats are assumed to be used in licensed carriers, existing subframes (=1 ms) are reserved as transmission periods. Meanwhile, in order to transmit a PUCCH in an unlicensed carrier, listening needs to be done successfully. However, assuming that listening succeeds in a predetermined subframe and the PUCCH is transmitted in the same subframe, it is not possible to reserve a period of 1 ms.

So the present inventors have studied a short PUCCH format that is suitable for use in carriers where listening is configured, and arrived at the fourth embodiment. Note that a PUCCH that is shorter than 1 ms may be referred to as a "shortened PUCCH (sPUCCH)."

According to the fourth embodiment, PUCCHs can be roughly divided into two types (type A and type B). Type A refers to the PUCCH for subframes not including DL. Type B refers to the PUCCH for subframes including DL. Note that the subframe in which the PUCCH of type A (B) is transmitted may be referred to as a "type A (B) PUCCH subframe."

Figure 8:
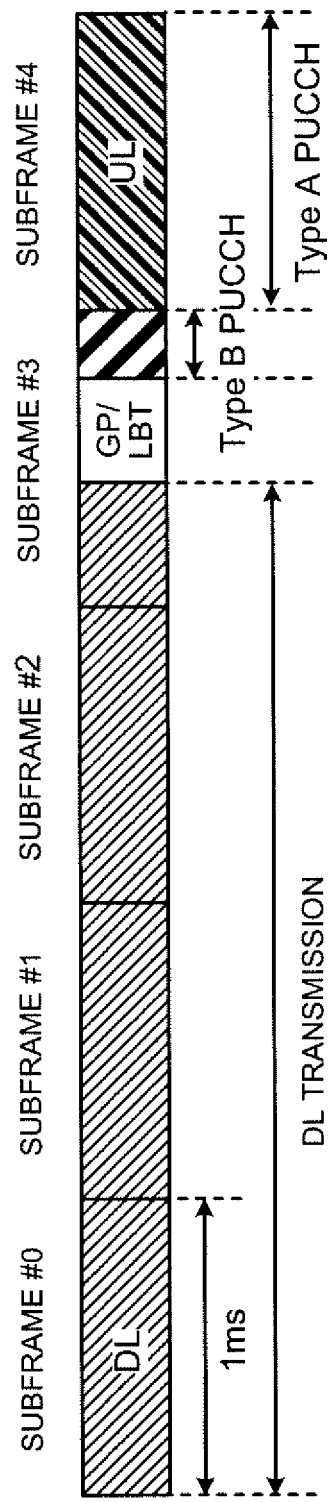
FIG. 8 is a diagram to explain PUCCH types according to a fourth embodiment of the present invention.

FIG. 8 is a diagram to explain a PUCCH type according to the fourth embodiment. In FIG. 8, an eNB succeeds in LBT at a time before subframe #0, and DL burst transmission takes place over a number of subframes (subframes #0 to #3).

In subframe #3, the eNB finishes DL transmission after partial DL transmission. When UE tries listening and succeeds, the UE may perform UL transmission in part of subframe #3 (partial UL transmission). Here, listening may be executed in a guard period (GP) for switching DL/UL.

A PUCCH that is transmitted in a subframe including DL, such as subframe #3, is a type-B PUCCH. Furthermore, in subframe #4, UL transmission can be performed following subframe #3. A PUCCH that is transmitted in a subframe not including DL, such as subframe #4, is a type-A PUCCH.

[Type-A PUCCH]

FIG. 9 is a diagram to show examples of subframe structures that type-A PUCCHs can take. FIG. 9 shows that 14 symbols (symbols #0 to #13) are included in 1 subframe. Also, PUCCHs (including DMRSs) are mapped to hatched time resources. Resources to which DMRSs may be mapped will be described later with reference to FIG. 11.

A type-A PUCCH may start (being transmitted) from the top of the subframe (types A-1 and A-5). PUCCHs such as types A-1 and A-5 may be used when, for example, a GP for LBT is reserved in the preceding subframe.

Also, a type-A PUCCH does not have to start (being transmitted) from the top of the subframe. In this case, the type-A PUCCH may be transmitted a predetermined gap period after the top of the subframe. The predetermined gap period may be, for example, 1 symbol (types A-2 and A-6), 25 μs (types A-3 and A-7), 25 μs+timing advance (TA) (types A-4 and A-8) or (4) any other length of time. PUCCHs such as types A-2, A-3, A-4, A-6 A-7 and A-8 may be used when, for example, no GP is reserved for LBT in the preceding subframe.

Also, a type-A PUCCH may end (being transmitted) with the last symbol in the subframe (types A-1, A-2, A-3 and A-4). Also, a type-A PUCCH may end (being transmitted) at a timing a predetermined period before the last symbol in the subframe (types A-5, A-6, A-7 and A-8). Note that, although FIG. 9 shows examples in which this predetermined period is 1 symbol, this is by no means limiting, and this predetermined period may be, for example, 25 μs.

Note that, although FIG. 9 shows examples where normal cyclic prefixes are used (where 1 subframe is comprised of 14 symbols), this is by no means limiting. For example, even when enhanced cyclic prefixes are used (where 1 subframe is comprised of 12 symbols), a PUCCH subframe structure that is designed based on the same policy may be used.

[Type-B PUCCH]

Figure 10:
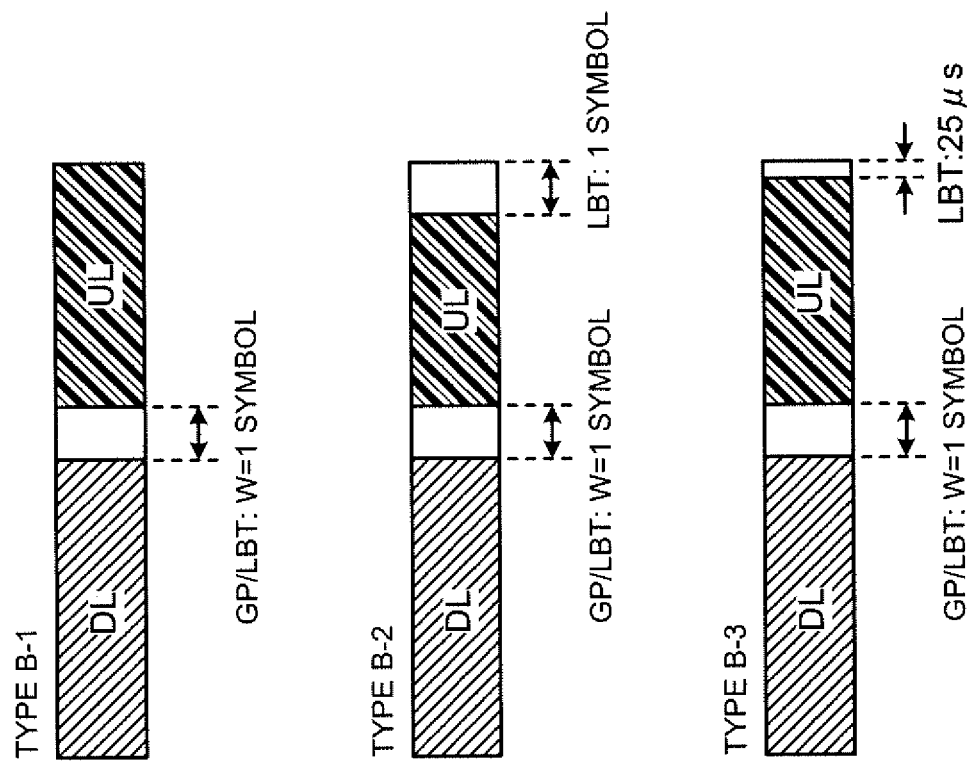
FIG. 10 is a diagram to show examples of type-B PUCCH subframe structures.

FIG. 10 is a diagram to show examples of type-B PUCCH subframe structures. FIG. 10 shows an overview of symbols included in 1 subframe. Also, each PUCCH (including the DMRS) is mapped to the time resource of the field labeled as "UL." Resources for mapping DMRSs will be described later with reference to FIG. 11.

A type-B PUCCH may start being transmitted a predetermined period (for example, W symbols) after the last DL symbol in the same subframe. The example of FIG. 10 shows a case where the predetermined period is W=1, but the value of W is not limited to this. The predetermined period corresponds to the period from the DL ending symbol to the UL starting symbol.

Also, a type-B PUCCH may end (being transmitted) with the last symbol in the subframe (type B-1). Also, a type-B PUCCH may end (being transmitted) at a timing a predetermined period before the last symbol in the subframe (types B-2 and B-3). FIG. 10 shows an example in which the predetermined period is 1 symbol (type B-2) and 25 μs, but this is by no means limiting.

In type-B PUCCH subframes, the number of symbols in the DL part may be determined based on partial DL subframes (partial subframes) of Rel-13 LTE, for example. To be more specific, in type-B PUCCH subframes, the number of symbols of the DL part may be limited to one of 3, 6, 9, 10, 11 and 12 symbols.

UE may select the number of UL symbols to use for the PUCCH based on the number of DL symbols and W. Note that the UE may not support type-B PUCCHs, which contains a specific number of symbols in the DL part (for example, 12 symbols). When the number of symbols of the DL part is configured large (for example, 12 symbols), few UL symbols are available for HARQ-ACK transmission, and they may not be allocated properly. In this case, by not supporting the PUCCH, this situation can be avoided. In other words, when transmitting a type-B PUCCH in a predetermined subframe, it may be assumed that the number of symbols of the DL part in this predetermined subframe is not a specific number.

[Determination Regarding PUCCH of Type A/B]

Information about the structures of type-A PUCCH subframes may be configured in (reported to) UE by way of higher layer signaling (for example, RRC signaling), physical layer signaling (for example, DCI) and/or other signals, or by combining these. This information about the structures of type-A PUCCH subframes may include at least one of information for specifying the type (for example, the types shown in FIG. 9), information about the timing the PUCCH starts (for example, the starting symbol), information about the timing the PUCCH ends (for example, the ending symbol) and information about the transmission time of the PUCCH (for example, the number of symbols).

Information about the structures of type-B PUCCH subframes may be configured in (reported to) UE by way of higher layer signaling (for example, RRC signaling), physical layer signaling (for example, DCI) and/or other signals, or by combining these. This information about the structures of type-B PUCCH subframes may include at least one of information for specifying the type (for example, the types shown in FIG. 10), the number of symbols of the DL part in type-B PUCCH subframes, W, information about the timing the PUCCH ends (for example, the ending symbol) and information about the transmission time of the PUCCH (for example, the number of symbols of the UL part).

Note that the association between the type-specifying information and the types to be identified may be configured in UE by higher layer signaling, or may be specified in the specification.

Whether or not type A and/or type-B PUCCHs are available (enabled/disabled) may be configured by higher layer signaling (for example, RRC signaling), physical layer signaling (for example DCI) and/or other signals, or by combining these, or the conditions for determining whether or not type A and/or type-B PUCCHs are available (enabled/disabled) may be defined in the specification.

[DMRS Configurations]

Now, DMRS configurations for type-A and type-B PUCCH subframes will be described below. When a PUCCH is 7 symbols long or more in time (one or more slots in existing LTE), predetermined 7 symbols included in the PUCCH may be mapped as in 1 slot in existing PUCCH formats. For example, when a type-A PUCCH subframe such as one shown in FIG. 9 is used, the first-half 7 symbols and the second-half 7 symbols may each adopt a DMRS configuration for an existing PUCCH format (DMRS symbol allocation).

When a PUCCH is 6 symbols long or less in time (an sPUCCH is transmitted), a new DMRS configuration may be employed. FIG. 11 is a diagram to show examples of DMRS configurations that can be applied to sPUCCHs. FIG. 11 shows configurations, in which each sPUCCH contains one or 2 DMRS symbols (the other symbols are used for the PUCCH (UCI)), and and in which the DMRS symbols are mapped near the center of the sPUCCH, DMRSs are by no means limited to the configurations of FIG. 11.

For example, if an sPUCCH is 2 symbols long, either the first or the second symbol may be used as the DMRS symbol. When an sPUCCH is 3 symbols long and the maximum OCC length is 2, the center (second) symbol may be used as the DMRS symbol.

When an sPUCCH is 4 symbols long and the maximum OCC length is 3, the second or the third symbol may be used as the DMRS symbol. When an sPUCCH is 4 symbols long and the maximum OCC length is 2, the second and third symbols may be used as DMRS symbols.

When an sPUCCH is 5 symbols long and the maximum OCC length is 4, the center (third) symbol may be used as the DMRS symbol. When an sPUCCH is 5 symbols long and the maximum OCC length is 3, the second and fourth symbols may be used as DMRS symbols.

When an sPUCCH is 6 symbols long and the maximum OCC length is 5, the third and fourth symbols may be used as DMRS symbols. When an sPUCCH is 6 symbols long and the maximum OCC length is 4, the third and fourth symbols, or the second and fifth symbols may be used as DMRS symbols.

Note that a type-A PUCCH can also be an sPUCCH, and, in that case, the DMRS configurations shown in FIG. 11 may be used.

(Variations)

Although examples have been described above with the first and second embodiments where signals based on a single PUCCH format are mapped to (transmitted in) multiple frequency resources that are discretely distributed in the frequency direction, embodiments of the present invention are not limited to these. For example, among these multiple frequency resources, it is possible to map signals to some frequency resources based on the first PUCCH format, and map signals to the other frequency resources based on a second PUCCH format, which is different from the first PUCCH format. By this means, signals can be configured in a flexible manner.

Also, when using the first or the second embodiment in pair with the fourth embodiment, a single PUCCH subframe structure may be applied to multiple frequency resources that are discretely distributed in the frequency direction. Also, among these multiple frequency resources, It may be possible to apply the first PUCCH subframe structure to some frequency resources, and Apply a second PUCCH subframe structure, which is different from the first PUCCH subframe structure, to the other frequency resources.

Also, when the first or the second embodiment is used in pair with the fourth embodiment, it may be possible to apply a single DMRS configuration to multiple frequency resources that are discretely distributed in the frequency direction. Also, among these multiple frequency resources, it may be possible to apply the first DMRS configuration to some frequency resources, and apply a second DMRS configuration, which is different from the first DMRS configuration, to the other frequency resources.

(Radio Communication System)

Now, the structure of a radio communication system according to one embodiment of the present invention will be described below. In this radio communication system, communication is performed using one or a combination of the radio communication methods according to the herein-contained embodiments of the present invention.

Figure 12:
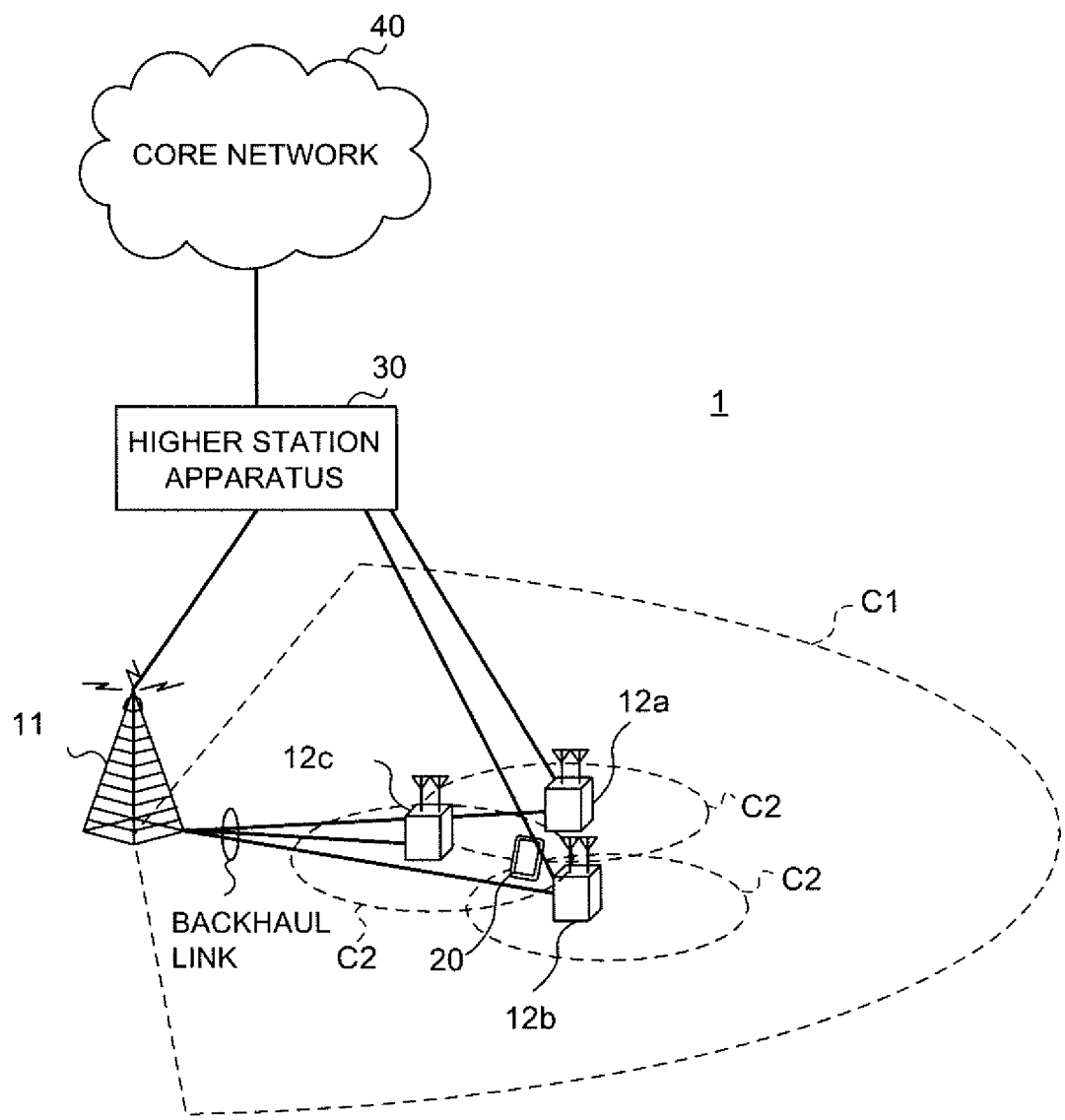
FIG. 12 is a diagram to show an exemplary schematic structure of a radio communication system according to an embodiment of the present invention.

FIG. 12 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system band constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th Generation mobile communication system)," "5G (5th Generation mobile communication system)," "FRA (Future Radio Access)," "New-RAT (Radio Access Technology)" and so on, or may be seen as a system to implement these.

The radio communication system 1 includes a radio base station 11 that forms a macro cell C1 of a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement of cells and user terminals 20 is not limited to that shown in the drawing.

The user terminals 20 can connect with both the radio base station 11 and the radio base stations 12. The user terminals 20 may use the macro cell C1 and the small cell C2, at the same time, based on CA or DC. Furthermore, the user terminals 20 may implement CA or DC by using a plurality of cells (CCs) (for example, 5 or fewer CCs, or 6 or more CCs).

The user terminals 20 and the radio base station 11 can communicate by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configurations of the frequency band for use in each radio base station are by no means limited to these.

A structure may be employed here in which wire connection (for example, optical fiber, which is in compliance with the CPRI (Common Public Radio Interface), the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that uplink and downlink radio access schemes are not limited to the combination of these, and other radio access schemes may be used.

Downlink channels that are used in the radio communication system 1 include a downlink shared channel (PDSCH (Physical Downlink Shared CHannel)), which is shared by each user terminal 20, a broadcast channel (PBCH (Physical Broadcast CHannel)), downlink L1/L2 control channels, and so on. User data, higher layer control information, SIBs (System Information Blocks) and so on are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (Physical Downlink Shared CHannel), and used to communicate DCI and so on, like the PDCCH.

Uplink channels used in the radio communication system 1 include an uplink shared channel (PUSCH (Physical Uplink Shared CHannel)), which is shared by each user terminal 20, uplink control channel (PUCCH (Physical Uplink Control CHannel)), a random access channel (PRACH (Physical Random Access CHannel)) and so on. User data, higher layer control information and so on are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, sounding reference signals (SRSs), demodulation reference signals (DMRSs) and so on are communicated as uplink reference signals. Note that DMRSs may be referred to as "user terminal-specific reference signals (UE-specific Reference Signals)." Also, the reference signals to be communicated are by no means limited to these.

(Radio Base Station)

Figure 13:
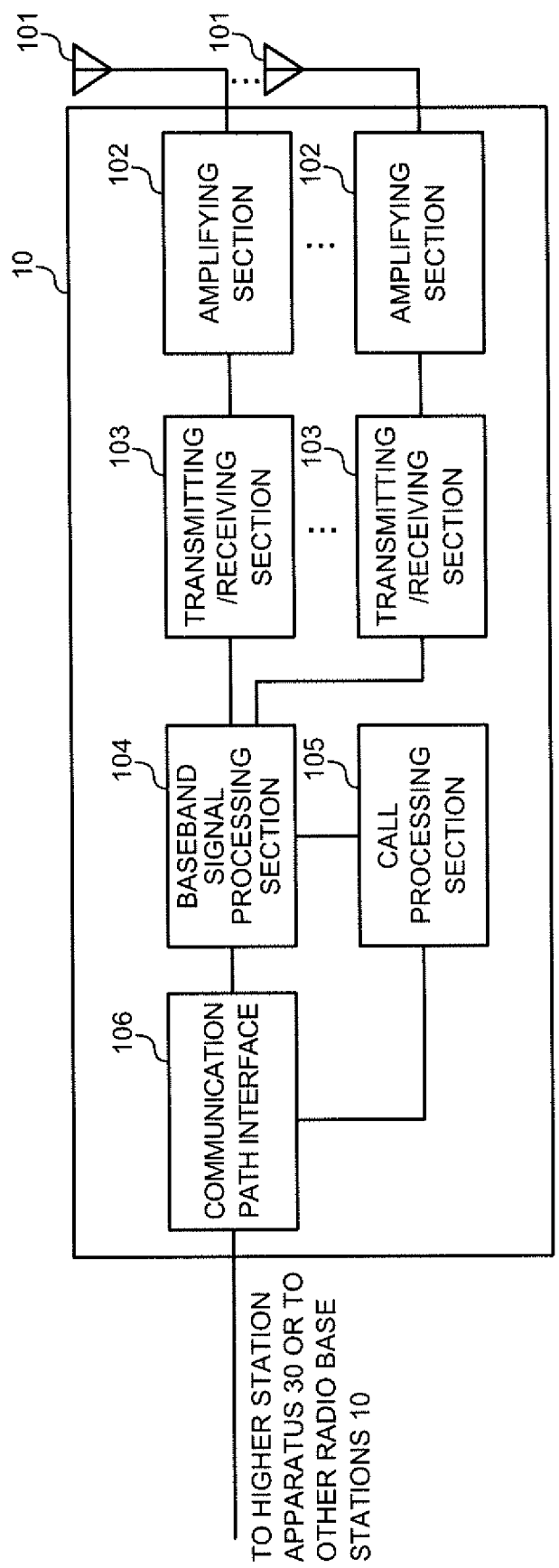
FIG. 13 is a diagram to show an exemplary overall structure of a radio base station according to an embodiment of the present invention.

FIG. 13 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing) for communication channels, manages the state of the radio base station 10, and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 receive uplink control signals (for example, UCI) from a user terminal 20 in a predetermined carrier. The transmitting/receiving sections 103 may transmit at least one of information about the uplink control channel (PUCCH) that is transmitted repeatedly in the frequency domain information about the configuration of interlaces, and information about the structures of type-A and/or type-B uplink control channel (PUCCH) subframes to the user terminal 20.

Figure 14:
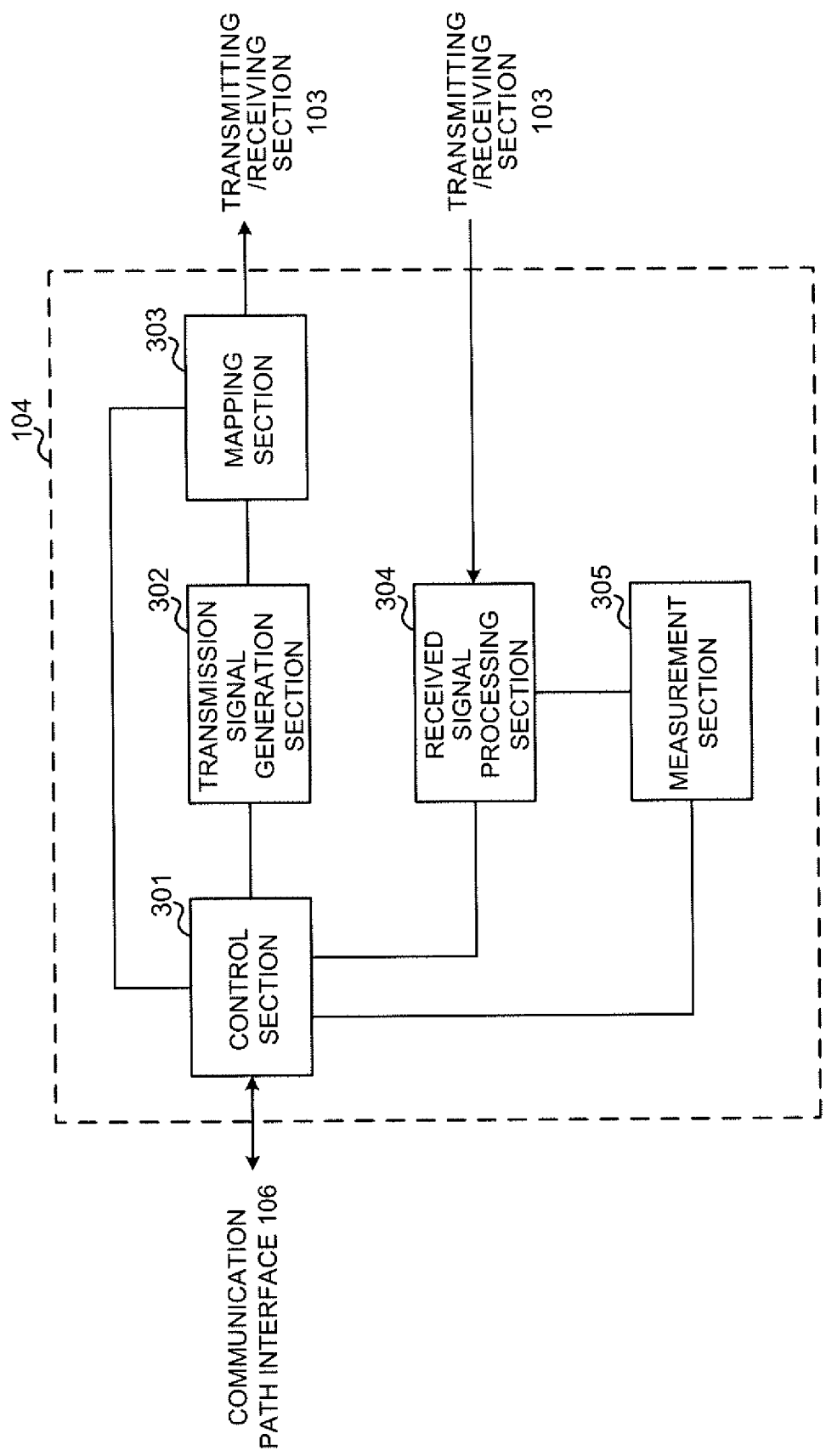
FIG. 14 is a diagram to show an exemplary functional structure of a radio base station according to one embodiment of the present invention.

FIG. 14 is a diagram to show an exemplary functional structure of a radio base station according to one embodiment of the present invention. Note that, although this example primarily shows functional blocks that pertain to characteristic parts of the present embodiment, a radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals that are transmitted in the PDSCH, and downlink control signals that are communicated in the PDCCH and/or the EPDCCH. Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, PSS (Primary Synchronization Signal)/SSS (Secondary Synchronization Signal)), downlink reference signals (for example, CRSs, CSI-RSs, DMRSs and so on) and so on.

In addition, the control section 301 controls the scheduling of uplink data signals transmitted in the PUSCH, uplink control signals (for example, delivery acknowledgement information) transmitted in the PUCCH and/or the PUSCH, random access preambles transmitted in the PRACH, uplink reference signals, and so on.

The control section 301 may control the transmission signal generation sections 302 and the mapping section 303 to transmit downlink signals in a carrier (for example, an unlicensed carrier) in which listening is performed before downlink transmission, based on the result of LBT obtained in the measurement section 305.

The control section 301 may exert control, in a given carrier (for example, a carrier that requires listening before transmission, an unlicensed carrier, etc.), a user terminal 20 to transmit uplink control signals (for example, UCI) in an uplink control channel (for example, PUCCH). The control section 301 may exert control so that signals that are transmitted by using uplink control channels mapped at the same timing (in the same time resource) to a plurality of frequency resources that are discretely distributed in the frequency direction are received (receiving process).

For example, the control section 301 may exert control so that an uplink control channel that is mapped in each of a plurality of frequency resources according to a predetermined uplink control channel format (PUCCH format) is received. Also, the control section 301 may exert control so that an uplink control channel that is divided and mapped according to a predetermined uplink control channel format by using two or more of the plurality of frequency resources is received.

The control section 301 may exert control so that an uplink control channel, to which at least one of an orthogonal code and a cyclic shift is applied in the time domain and/or the frequency domain, is received. Also, the control section 301 may exert control so that a receiving process (such as demodulation) is performed based on a single DMRS sequence that is divided and mapped by using two or more of the plurality of frequency resources.

The control section 301 may judge that, in a subframe (PUCCH subframe) in which an uplink control channel is received, no transmission takes place (transmission is muted) at timings before and/or after the uplink control channel is transmitted.

The transmission signal generation section 302 generates downlink signals (downlink control signals, downlink data signals, downlink reference signals and so on) as commanded by the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, as commanded by the control section 301. Also, downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources as commanded by the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). The received signal processing section 304 can be constituted by a signal processor, a signal processing circuit or signal processing apparatus that can be described based on general understanding of the technical field to which the present invention pertains.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may execute LBT in a carrier where LBT is configured (for example, an unlicensed carrier) based on a command from the control section 301, and outputs the result of LBT (for example, judgment as to whether the channel state is free or busy) to the control section 301.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example, CSI) and so on. The measurement results may be output to the control section 301.

(User Terminal)

Figure 15:
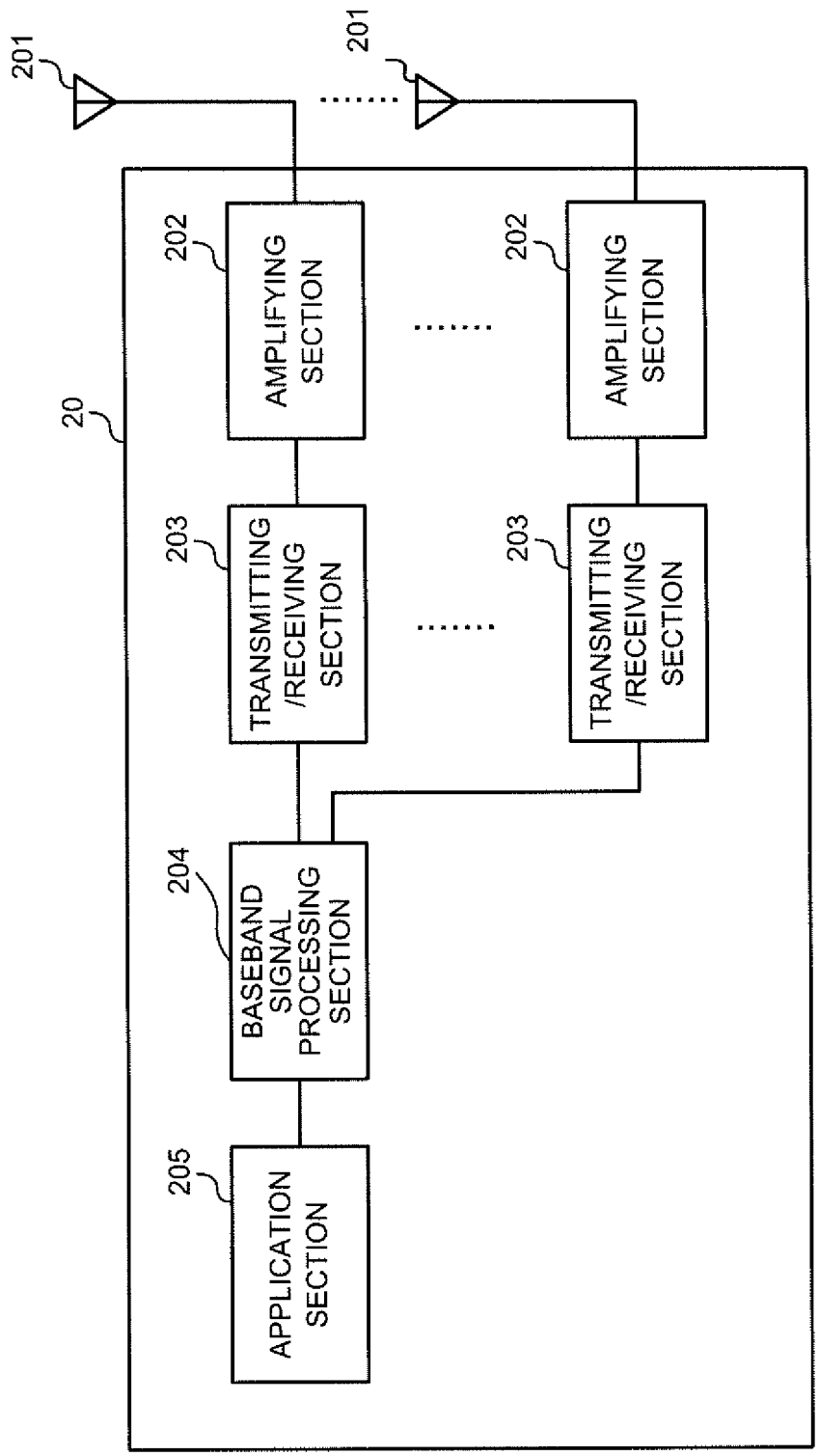
FIG. 15 is a diagram to show an exemplary overall structure of a user terminal according to an embodiment of the present invention.

FIG. 15 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving sections 203 can be constituted by transmitters/receivers, transmitting/receiving circuits or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit uplink control signals (for example, UCI) to the radio base station 10 in a predetermined carrier. The transmitting/receiving sections 203 may receive at least one of information about the uplink control channel (PUCCH) that is transmitted repeatedly in the frequency domain, information about the configuration of interlaces, and information about the structures of type-A and/or type-B uplink control channel (PUCCH) subframes, from the radio base station 10.

Figure 16:
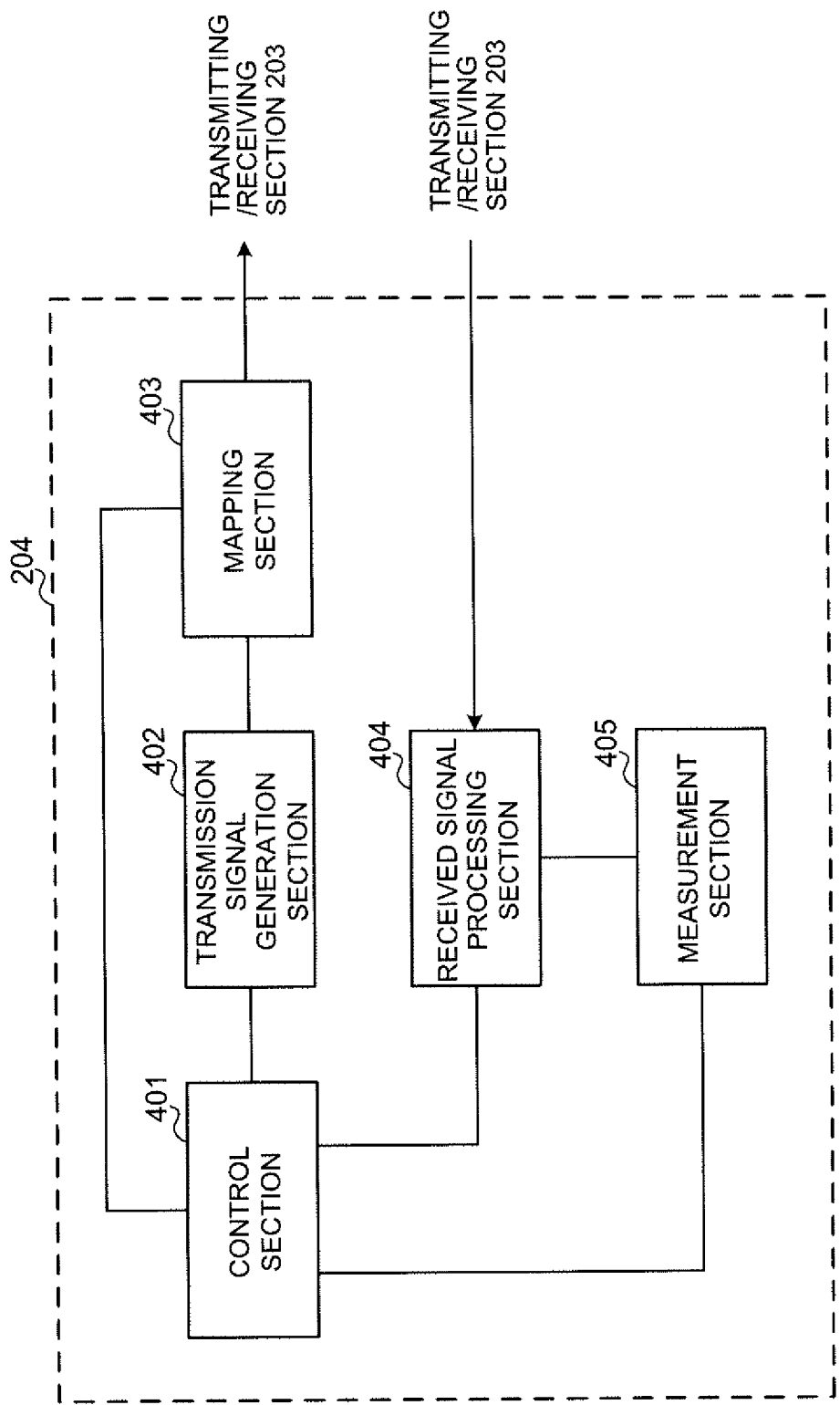
FIG. 16 is a diagram to show an exemplary functional structure of a user terminal according to an embodiment of the present invention.

FIG. 16 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405 and so on.

The control section 401 acquires downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and/or the like), uplink data signals and so on based on whether or not retransmission control is necessary, which is decided in response to downlink control signals, downlink data signals and so on.

The control section 401 may control the transmission signal generation sections 402 and the mapping section 403 to transmit uplink signals in a carrier (for example, an unlicensed carrier) in which listening is performed before uplink transmission, based on the result of LBT obtained in the measurement section 405.

The control section 401 may exert control so that, in a predetermined carrier (for example, a carrier that requires listening before transmission, an unlicensed carrier, etc.), an uplink control signal (for example UCI) is transmitted in an uplink control channel (for example PUCCH). The control section 401 may exert control so that an uplink control channel is mapped to a plurality of frequency resources that are discretely distributed in the frequency direction, at the same timing (in the same time resource).

For example, the control section 401 may exert control so that an uplink control channel conforming to a predetermined uplink control channel format (PUCCH format) is mapped to each of a plurality of frequency resources. Also, the control section 401 may exert control so that an uplink control channel conforming to a predetermined uplink control channel format is divided and mapped by using two or more of the plurality of frequency resources.

The control section 401 may exert control so that at least one of an orthogonal code and a cyclic shift is applied to the uplink control channel in the time domain and/or frequency domain. Also, the control section 401 may exert control so that a single DMRS sequence is divided and mapped by using two or more of multiple frequency resources.

The control section 401 may exert control so that, in a subframe in which an uplink control channel is mapped (PUCCH subframe), no transmission takes place at timings before and/or after the uplink control channel is transmitted (a non-transmission period is provided before and/or after the PUCCH is transmitted).

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) as commanded by the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates delivery acknowledgement information, uplink control signals related to channel state information (CSI) and so on, as commanded by the control section 401. Also, the transmission signal generation section 402 generates uplink data signals as commanded by the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources as commanded by the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 executes LBT in carriers where LBT is configured, based on commands from the control section 401. The measurement section 405 may output the results of LBT (for example, judgments as to whether the channel state is free or busy), to the control section 401.

The measurement section 405 may measure, for example, the received power (for example, RSRP), the received quality (for example, RSRQ, received SINR), down link channel information (for example, CSI) and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 17:
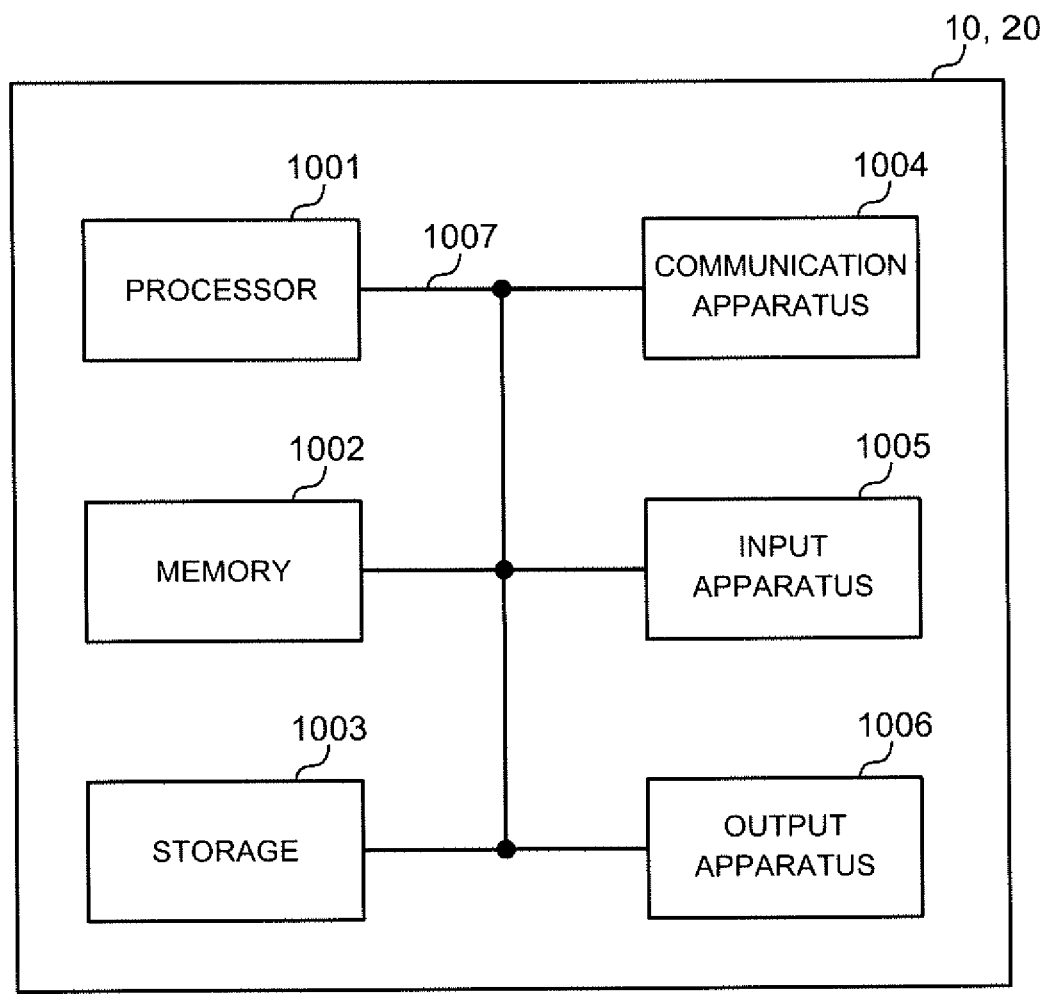
FIG. 17 is a diagram to show an exemplary hardware structure of a radio base station and a user terminal according to an embodiment of the present invention.

For example, the radio base station, user terminals and so on according to embodiments of the present invention may function as a computer that executes the processes of the radio communication method of the present invention. FIG. 17 is a diagram to show an exemplary hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a plurality of processors may be provided. Furthermore, processes may be implemented with one processor, or processes may be implemented simultaneously, in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be comprised of a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, 1 subframe may be referred to as a "transmission time interval (TTI)," a plurality of consecutive subframes may be referred to as a "TTI," or 1 slot may be referred to as a "TTI." That is, a subframe and/or a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit of channel-encoded data packets (transport blocks), code blocks and/or codewords, or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 subframe or one TTI in length. One TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and 1 symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each example/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-176858, filed on Sep. 9, 2016, including the specification, drawings and abstract, is incorporated herein by reference in its entirety.

The invention claimed is:

1. A terminal comprising:
   a transmitter that transmits an uplink control signal in an uplink control channel; and
   a processor that maps the uplink control channel according to given uplink control channel format 2 or 3 to two or more interlaces,
   wherein the interlaces are each configured with a plurality of frequency resources which are discretely distributed in a frequency direction, and
   the processor exerts control to apply an orthogonal code to the uplink control channel, mapped to the plurality of frequency resources which are discretely distributed in the frequency direction, in a frequency domain.

2. The terminal according to claim 1, wherein the transmitter transmits the uplink control channel in a carrier in which listening is performed before uplink transmission.

3. A radio communication method for a terminal, the method comprising:
   transmitting an uplink control signal in an uplink control channel;
   mapping the uplink control channel according to given uplink control channel format 2 or 3 to two or more interlaces,
   wherein the interlaces are each configured with a plurality of frequency resources which are discretely distributed in a frequency direction; and
   applying an orthogonal code to the uplink control channel, mapped to the plurality of frequency resources which are discretely distributed in the frequency direction, in a frequency domain.

4. A base station comprising:
   a processor that controls to receive an uplink control channel according to given uplink control channel format 2 or 3 mapped to two or more interlaces,
   the interlaces being each configured with a plurality of frequency resources which are discretely distributed in a frequency direction; and
   a receiver that receives an uplink control signal in the uplink control channel,
   wherein an orthogonal code is applied to the uplink control channel, mapped to the plurality of frequency resources which are discretely distributed in the frequency direction, in a frequency domain.

5. A system comprising a terminal and a base station, wherein:
   the terminal comprises:
      a transmitter that transmits an uplink control signal in an uplink control channel; and
      a processor of the terminal that maps the uplink control channel according to given uplink control channel format 2 or 3 to two or more interlaces,
      wherein the interlaces are each configured with a plurality of frequency resources which are discretely distributed in a frequency direction, and the processor of the terminal exerts control to apply an orthogonal code to the uplink control channel, mapped to the plurality of frequency resources which are discretely distributed in the frequency direction, in a frequency domain; and
   the base station comprises:
      a processor of the base station that controls to receive the uplink control channel according to the given uplink control channel format 2 or 3 mapped to the two or more interlaces,
      a receiver that receives the uplink control signal in the uplink control channel.

* * * * *